(12) United States Patent
Besemer

(10) Patent No.: US 6,620,928 B2
(45) Date of Patent: Sep. 16, 2003

(54) RECOVERY PROCESS FOR SPENT PERIODATE

(75) Inventor: Arie Besemer, Amerongen (NL)

(73) Assignee: SCA Hygiene Products Zeist B.V., Zeist (NL)

(*) Notice: Subject to any disclaimer, the term of this patent is extended or adjusted under 35 U.S.C. 154(b) by 0 days.

(21) Appl. No.: 10/013,449

(22) Filed: Dec. 13, 2001

(65) Prior Publication Data

US 2002/0072599 A1 Jun. 13, 2002

Related U.S. Application Data
(60) Provisional application No. 60/255,898, filed on Dec. 18, 2000.

(30) Foreign Application Priority Data

Dec. 13, 2000 (EP) .............................................. 00204482

(51) Int. Cl.⁷ .......................... C08B 31/18; C08B 33/08; C08B 35/08; C01B 11/22
(52) U.S. Cl. ...................... 536/124; 536/102; 536/104; 536/105; 536/123.1; 536/18.5; 536/56; 562/411; 423/476
(58) Field of Search ................................. 536/124, 102, 536/104, 105, 123.1, 18.5, 56; 423/476; 562/411

(56) References Cited

U.S. PATENT DOCUMENTS 4,176,167 A * 11/1979 Jernigan et al. ............ 423/476

6,538,132 B1 * 3/2003 Besemer et al.

FOREIGN PATENT DOCUMENTS

| EP | 0 913 358 | 5/1999 |
| WO | 98/27118 | 6/1998 |
| WO | 00/26257 | 5/2000 |

OTHER PUBLICATIONS

T.P. Nevell "Oxidation of Cellulose" in Cellulose Chemistry and Its Applications, T.P. Nevell and S. Haig Zeronian, Ellis Harwood, 1985, pp. 243–265.*

Floor, M., et al., "Preparation and Calcium Complexation of Oxidized Polysaccharides, Part I: Oxidation of Maltodextrins and Starch with Alkaline Sodium Hypochlorite", *Recl. Trav. Chim. Pays Bas*, 108: 348–354, 1989.

* cited by examiner

Primary Examiner—Samuel Barts
Assistant Examiner—Michael C. Henry
(74) Attorney, Agent, or Firm—Burns, Doane, Swecker & Mathis, L.L.P.

(57) ABSTRACT

The invention pertains to a process for the regeneration and recovery of periodate from a spent iodate solution, by reacting the iodate with at least an equimolar amount of peroxosulfate. The regenerated periodate is especially suitable for oxidizing carbohydrates to dialdehyde carbohydrates. The oxidation and regeneration can also be carried out in a single stage using a catalytic amount of periodate only.

7 Claims, No Drawings

RECOVERY PROCESS FOR SPENT PERIODATE

This application claims priority under 35 U.S.C. §§119 and/or 365 to 00204482.4 filed in Europe on Dec. 13, 2000 and to U.S. Provisional Application No. 60/255.898 filed on Dec. 18, 2000; the entire content of which is hereby incorporated by reference.

The invention relates to a process for regenerating periodic acid and to a process of oxidizing carbohydrates with periodic acid with regeneration and recovery of the periodic acid.

Periodic acid is extensively used for oxidizing vicinal diols resulting in dialdehydes according to the following reaction:

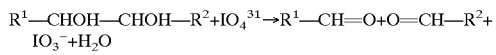

Instead of periodate ($IO_4^-$), the actual oxidizing species is para- or meta-periodate ($H_nIO_6^{(5-n)-}$), which results from reaction of periodic acid with water:

In the present description, all such oxoiodate species of heptavalent iodine, whether in neutral or in deprotonated form, are referred to as periodate. Usually, the two groups $R^1$ and $R^2$ are part of the same ring system, such as in carbohydrates. The most common process in which periodate is used as an oxidizing agent is the oxidation of starch to dialdehyde starch (DAS), which is used as a wet strength additive for paper, or can be further oxidized to calcium-binding dicarboxy starch.

As periodate is an expensive oxidizing agent, the spent oxidizing agent, i.e. iodate, should be regenerated to periodate. This is usually done by oxidation with hypochlorite, as described by McGuire and Mehltretter, Die Stärke, 23, (1971) 42–45. According to this method, spent iodate is treated with 1.5 mol equivalents (3.0 redox equivalents) of sodium hypochlorite at pH 13–14 and at 90–95° C. for 40 min, resulting in an average recovery of 97.6% periodate, EP-A-913358 (DSM) discloses the preparation of sodium para-periodate from iodine, iodide or iodate using alkaline sodium hypochlorite in the presence of other ions such as chloride or sulfate WO 98/27118 (Avebe) describes oxidation of starch with periodate, and recovery of periodate by oxidation of the iodate with ozone.

The prior art methods for periodate recovery have drawbacks in that they are performed at high pH, so that the product cannot be directly used in a process performed under acidic conditions. Moreover, processes using hypohalite are undesired, since they produce substantial amounts of chlorinated by-products.

It was found according to the invention that the regeneration of periodate can be improved using persulfuric acid as the oxidizing species. The persulfuric acid or peroxosulfate may have any form, and is preferably a mixed salt such as commercially available Oxone® ($2KHSO_5.KHSO_4.K_2SO_4$). The regeneration proceeds not only for producing periodate from iodate, preferably an iodate-containing solution, but also from iodide or other iodine species having lower oxidation states than the oxidation slate in periodate (+7).

The process of the invention allows short regeneration times and low temperatures (0–20° C.), although higher temperatures, up to about 60° C. can be used as well. The process also avoids the formation of halogenated products of the periodate oxidation and the production of halide byproducts. Moreover, the oxidation can be carried out at acidic pH, as low as pH 3, up to about pH 8. This is especially advantageous where the periodate is used in an oxidation process at low pH, such as the oxidation of polysaccharides to produce dialdehyde polysaccharides, as this avoids the need for a pH adjustment between oxidation and regeneration. This allows both steps to be performed simultaneously and/or using the same reactor, if the reaction product of the oxidation is compatible with the peroxosulfate.

Thus, according to an embodiment of the present invention, the process can be carried out in the same reactor as the process in which the periodate is used for oxidizing a substrate, in particular a α,β-diol. In another embodiment of the invention, the regeneration reaction is carried out simultaneously with the oxidation reaction but physically separated from it. For example, a two-compartment system can be designed, comprising a reaction compartment and a regeneration compartment, with a filter being provided between the two compartments. The filter can e.g. be a polymeric membranes and can serve to keep the (insoluble) reaction product of the oxidation reaction, such as dialdehyde starch, in the reaction compartment and the peroxosulfate in the regeneration compartment. In these embodiments, the reaction can be performed continuously or semi-continuously, and the periodate can be used in sub-stoichiometric (catalytic) amounts, e.g. 0.05–0.5 equivalents. These embodiments require a careful control of peroxosulfate addition so as to avoid an excess of peroxosulfate to be present with the substrate.

Alternatively, the process can be performed batch-wise. A stoichiometrical or near-stoichiometrical amount of periodate can then be used. The iodate produced in the oxidation reaction can be separated from the reaction mixture by precipitation, if necessary by increasing the pH, and the iodate can then be regenerated in a separate reactor following the process of the invention. If the substrate and the reaction product are insoluble, such as with cellulose fibers, the can be simply separated from the action mixture by filtration or decanting, before optional precipitation of the spent iodate.

The regenerated periodate is particularly suitable for the oxidation of carbohydrates to produce carbohydrate dialdehydes, such as members of the starch family (starch, amylose, amylopectin, hydrolysates and derivatives thereof), cellulose, other glucans, galactomannans (guar, locust bean gum), fructans (inulin), xylans, and the like, and alkylated, carboxyalkylated, hydroxyalkylated and other derivatives thereof, provided they contain vicinal diol groups (—CHOH—CHOH—). Starch and starch derivatives and cellulose are especially preferred. It is observed that where the carbohydrate oxidation product is soluble in the reaction medium such as with low molecular weight carbohydrate dialdehydes, an effective separation of oxidation product (dialdehyde) and iodate can be achieved by precipitating the iodate, e.g. by addition of potassium or magnesium ions or an organic solvent such as ethanol. The precipitated iodate is then reoxidized by redissolution and oxidation as described above. When the oxidation and regeneration are carried out simultaneously, the pH is preferably between 3.5 and 6, most preferably between 4 and 5. The temperature can be kept low, e.g. between 0 and 10° C.

The dialdehyde oxidation products thus obtained can be used for various purposes, e.g., as a crosslinking agent, as an additive e.g. in glues, coatings, thickeners, and the like, or as a carrier material e.g. for proteins. The dialdehydes are also suitable as wet strength agents, optionally after partial further oxidation to products having both aldehyde and carboxyl groups (see WO 00/26257). They may also be used as starting material for producing dicarboxy carbohydrates, which are suitable e.g. as calcium binding agents and as a raw material for producing superabsorbent materials. The dicarboxy carbohydrates can be conveniently prepared from the dialdehyde carbohydrates by oxidation with usual oxidizing agents, in particular sodium chlorite.

The dicarboxy starches that can be obtained from the dialdehyde starches prepared by using extended periodate oxidation periods (e.g. 4–8 days) have an unexpectedly high calcium-binding power, as measured by their sequestering capacity (SC) of at least 2.8, especially at least 3.0 mmol Ca/g.

EXAMPLES

Example 1

Preparation of Dialdehyde Starch

In 2 l water 110 g potato starch (AVEBE, dry weight 92.4 g, 0.57 mol) was suspended. The mixture was cooled to approximately 5° C. and then 123 g periodate (Aldrich, 99%, 0.57 mol ACS) was added. The mixture was stirred in the dark for 6 days. Then stirring was stopped and the dialdehyde starch was allowed to precipitate. The supernatant liquid was removed by decantation and to the resulting precipitate 500 ml water was added. After stirring for about 15 minutes the decantation and washing procedure was repeated. After four washings, the last supernatant contained less than 1% of the total amount of iodate. The washing liquids were collected and concentrated in vacuum to about 1 l. Treatment of this concentrated solution with persulfuric acid is described in Example 3.

Example 2

Preparation of Dicarboxy Starch

Dialdehyde starch was oxidized essentially according to the procedure described by Floor et al. (Recl. Trav. Chim. Pays Bas, 108, 384 (1989)). The (wet) dialdehyde starch was suspended in 500 ml of water and 30 ml hydrogen peroxide (Merck, 30% w/w, 300 mmol) was added. The mixture was cooled in an ice bath to approximately 5° C. and kept at this temperature during addition of sodium chlorite. Afterwards, the temperature was allowed to increase to room temperature. In the course of 6 hours 120 g of sodium chlorite (Aldrich, 80% purity) was added in small portions. The pH was brought to 5 and maintained at this value throughout the reaction by addition of 0.5 M NaOH, controlled by a pH stat (Metrohm). After the addition of sodium chlorite was complete, the mixture was allowed to react for 18 hours. The pH was brought to 10 and after standing for a few hours, the mixture was concentrated in vacuo to a volume of 600 ml. The viscous solution was poured (under stirring) into 2 l ethanol. A white oily precipitate was obtained. A stirring for one night, the supernatant liquid was clear. It was removed by decanting. The semi-solid residue was dissolved in water (400 ml) and the procedure was repeated. The semi-solid, which was obtained after this procedure was again dissolved in water (500 ml) and the resulting solution was freeze-dried. Dicarboxy starch was obtained as a white solid. The Ca sequestering capacity (SC) was determined as described by Floor to be 2.4 mmol Ca/g. The yield was 135 g (95%). The total yield with respect to Ca binding capacity was 324 mmol Ca.

Example 3

Regeneration of Periodate

To the solution of sodium iodate as obtained in Example 1, Oxone® (Aldrich, content 84%) was added at room temperature. In the course of approximately three hours 195 g Oxone was added. After every addition the pH dropped to about 4. Sodium hydroxide solution was added to bring the pH between 6 and 7. Then the pH started to decrease again, due to the conversion of $HSO_5^-$ to $H^+$ and $SO_4^{2-}$. During reaction a white precipitate was formed.

Example 4

Oxidation of Starch with Regenerated Periodate

After completion of the reaction of example 3, starch (potato starch, 85 g dry material) was added. The mixture was allowed to react in the dark at 5° C. for four days. Then the dialdehyde starch was allowed to precipitate and the supernatant liquid was removed by decanting. After washing the dialdehyde starch with water, the material was oxidized as described in Example 2.

Example 5

Preparation of Dicarboxy Starch

To the reaction mixture obtained in example 4, 60 ml hydrogen peroxide (30 w/w) and sodium chlorite (110 g) were added. The total consumption of sodium hydroxide was 2400 ml 0.5 M. After the reaction was complete, as was evident from the fact that no acid was produced anymore, the pH was brought to 10. After desalting by membrane filtration, he solution was freeze-dried. A solid was obtained in a yield of 102 g. The CaSC of the material was 3.0 mmol Ca per g, to yield a total Ca binding of 306 mmol.

Example 6

Preparation of Dicarboxy Starch

In 400 ml of water 18.3 gram high-amylose starch (Hylon VII, National Starch and Chemicals) was suspended. 24.2 g sodium periodate was added and then the mixture was stirred at room temperature for three days. Then, the dialdehyde starch was allowed to precipitate. The supernatant liquid was removed by decanting. The dialdehyde starch slurry was washed three times with 500 ml of water and the solution with sodium iodate and the washing liquids were combined and concentrated to a volume of about 1 l. The dialdehyde starch was oxidized using the method of Example 2. A faintly yellow product was obtained (17 g; yield 73%). The CaSC was 3.7 mmol/g. Total Ca binding yield was 63 mmol.

Example 7

Regeneration of Periodate and Oxidation of Starch

The sodium iodate solution obtained in Example 6 was converted to periodate. In the course of a few hours 37 g of Oxone was added. After every addition the pH decreased due to the acid present in the Oxone. The pH was brought to approximately 7 and then kept between 6 and 8 by addition of 0.5 NaOH-solution During the reaction a white precipitate was formed. After one night stirring, the mixture was used to prepare dialdehyde starch in the same way as described in Example 4. The dialdehyde starch was subsequently converted to dicarboxy starch as described in Example 5, Yield: 20 g(80%), CaSC=2.5 mmol, and thus total Ca binding yield 50 mmol.

Example 8

Regeneration of Periodate and Oxidation of Starch

To a solution of 2.13 g sodium iodate (Aldrich, 10.8 mmol), 3.5 g Oxone (90%, corresponding to 10.2 mmol as $HSO_5$ was added batch-wise. After reacting for one night, 2.12 g potato starch was added. The mixture was stirred for 5 hours. The iodate was removed by filtration and the filtrate were washed repeatedly with water until the major part of the salt was removed (>99%).

Example 9

Preparation of Dicarboxy Starch

The dialdehyde starch obtained in example 8 was suspended in 15 ml water and cooled in ice. The pH was brought to 5 and then hydrogen peroxide (2 ml, 30% w/w) was added. Then, sodium chlorite was added in small quantities of about 250 mg per time. In total 2.75 g was added. Upon reaction acid was produced, which resulted in a pH decrease. To maintain the pH at 5, sodium hydroxide solution (0.5 M) was added. After one night the total consumption was 22 ml 0.5M NaOH. The pH was brought to 10 by addition of more NaOH (4 ml 0.5 M NaOH), The CaSC of the isolated material was 3.3 mol Ca/g.

I claim:

1. A process for the regeneration and recovery of periodate from spent iodate, comprising reacting the iodate with at least an equimolar amount of peroxosulfate.

2. The process according to claim 1, in which the regeneration is carried out at a pH between 3 and 8.

3. The process according to claim 1, in which the regeneration is carried out at a temperature between 0 and 60° C.

4. A process for producing dialdehyde carbohydrates by oxidation of carbohydrates with periodate and regenerating periodate, comprising regenerating the periodate by reacting iodate with at least an equimolar amount of peroxosulfate.

5. The process according to claim 4, in which the carbohydrate is selected from starch and cellulose.

6. The process according to claim 5, in which the dialdehyde carbohydrate is further oxidized to a dicarboxy carbohydrate.

7. The process according to claim 5, in which the dialdehyde carbohydrate is further oxidized to a carbohydrate containing both aldehyde and carboxyl groups.

* * * * *